May 14, 1968     O. VIELMO     3,383,085
COUPLING
Filed Aug. 10, 1965
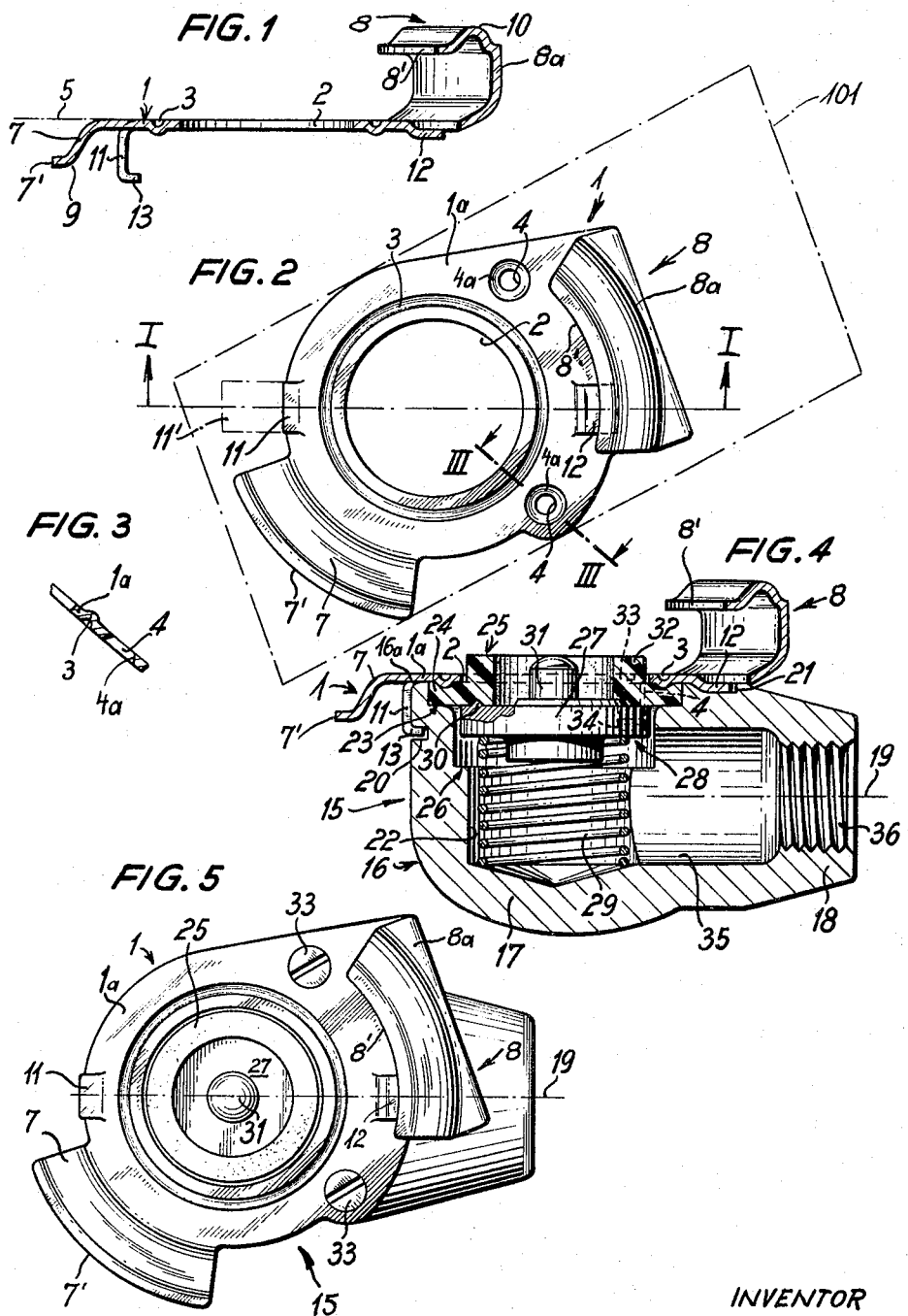
INVENTOR
OSKAR VIELMO
BY *Michael S. Striker*
his ATTORNEY

# United States Patent Office 3,383,085
Patented May 14, 1968

3,383,085
COUPLING
Oskar Vielmo, Stuttgart-Sonnenberg, Germany, assignor to Robert Bosch, G.m.b.H., Stuttgart, Germany
Filed Aug. 10, 1965, Ser. No. 478,619
Claims priority, application Germany, Aug. 17, 1964, B 78,128
9 Claims. (Cl. 251—149.5)

ABSTRACT OF THE DISCLOSURE

A coupling comprises a coupling element consisting of a hollow carrier which is provided in an end face therein with a fluid-conveying passage. A replaceable clamp is provided and includes a planar main section located adjacent to the end face and having an aperture registering with the end of the passage therein, and a pair of angularly spaced retaining sections which are respectively integral with the main section and which have arcuate guide portions disposed at the opposite sides of and spaced from the main section. Releasable means releasably secures the clamp to the carrier against movement relative to the latter.

---

The present invention relates to couplings in general, and more particularly to improvements in a fluid conveying coupling of the type which may be utilized with advantage to provide a communicative connection between the supply lines or service lines in the brake system of an automotive vehicle. For example, the coupling of my invention may be used to connect the service line or the supply line of a towing vehicle with the corresponding line of a trailer so that the brake system of the trailer may be operated by the driver sitting in the cab of the towing vehicle. Still more particularly, the invention relates to a coupling which constitutes a further development of and an improvement over couplings of the type disclosed in my U.S. Patent No. 3,155,434.

It is an important object of the present invention to provide a very simple, inexpensive and rugged coupling which may be readily assembled or taken apart without necessitating the use of complicated tools, which can withstand shocks, vibrations and other undesirable influences when the vehicle is in motion and travels on uneven terrain, which is capable of automatically preventing uncontrolled escape of fluid when its cooperating elements are detached from each other, and which can be produced and assembled in relatively simple and readily available machines.

Another object of the invention is to provide a coupling of the just outlined characteristics which is particularly suited for use in air-operated brake systems.

A further object of the invention is to provide a lightweight but strong clamp or claw which may be used in a coupling of the above outlined characteristics.

An additional object of the invention is to provide a novel carrier which may be used in the improved coupling.

Still another object of the present invention is to provide a coupling element which embodies the improved carrier and the improved clamp and which may be assembled with a similar coupling element to form therewith the novel coupling.

A concomitant object of the invention is to provide a very simple and readily separable connection between the carrier and the clamp.

A further object of the instant invention is to provide a coupling of the above outlined characteristics which may be readily installed in many existing brake systems.

Another object of the invention is to provide a clamp which, in addition to serving as a means for connecting one coupling element to another coupling element, also performs at least one additional important function.

Briefly stated, one feature of my present invention resides in the provision of a coupling, particularly for communicatively connecting two fluid-conveying supply lines or service lines in the brake system of an automotive vehicle. The improved coupling comprises a pair of coupling elements each including a hollow carrier having an end face and provided with a fluid-conveying passage one end of which is located in the respective end face, a clamp consisting of a single sheet of metallic material and comprising a preferably planar main section having a preferably circular aperture which is adjacent to and registers with the end of the respective passage, two retaining sections which are angularly spaced from each other with reference to the center of the respective aperture and each of which includes an arcuate guide portion whose center of curvature is located in the center of the respective aperture, the two guide portions being spaced from and being located at the opposite sides of the plane of the respective main section and the guide portion which is located at one side of one of the main sections is in sliding engagement with the guide portion located at the other side of the other main section so that such guide portions provide a connection between the two clamps, and connecting means securing the clamps to the respective carriers. The other end of each passage is connected with one of the two interconnected fluid-conveying lines and at least one of the two coupling elements preferably comprises a valve which closes automatically when the two clamps are disconnected from each other to thus prevent uncontrolled escape of fluid.

The carriers preferably consist of cast metal and the clamps are preferably formed by stamping.

The novel features which are considered as characteristic of the invention are set forth in particular in the appended claims. The improved coupling itself, however, both as to its construction and the mode of assembling the same, together with additional features and advantages thereof, will be best understood upon perusal of the following detailed description of a specific embodiment with reference to the accompanying drawings, in which:

FIG. 1 is a central section through a clamp which is constructed and configurated in accordance with my invention, the section being taken in the direction of arrows as seen from the line I—I of FIG. 2;

FIG. 2 is a top plan view of the clamp;

FIG. 3 is a fragmentary section substantially as seen in the direction of arrows from the line III—III of FIG. 2;

FIG. 4 is a central section through a fully assembled coupling element which comprises the clamp of FIGS. 1 and 2 and a novel carrier; and FIG. 5 is a top plan view of the coupling element.

Referring first to FIGS. 1 and 2, there is shown a claw or clamp 1 which consists of a single sheet of steel or other suitable metallic material. This clamp may be obtained by trimming and deforming a substantially rectangular blank 101 which is indicated in FIG. 2 by phantom lines. In accordance with a feature of my invention, the clamp 1 comprises a substantially planar or flat main section 1a having a circular aperture 2 surrounded by a concentric annular corrugation or bead 3, this corrugation extending downwardly from the plane of the main section 1a, as viewed in FIG. 1. The main section 1a is further provided with two bores 4 which are angularly spaced from each other and which are formed in the centers of funnel-shaped depressions 4a extending to the same side of the plane of the section 1a as the corrugation 3. The general plane of the main section 1a is indicated in FIG. 1 by a phantom line 5.

The clamp 1 further comprises two retaining sections 7 and 8 which are angularly spaced from each other with reference to the center of the aperture 2. For example, the central plane of the retaining section 7 may make with the section line I—I an angle of about 45 degrees, and the central plane of the retaining section 8 makes with the line I—I an angle of approximately 30 degrees. The retaining section 7 has an arcuate guide portion 7' which is located at one side of the plane 5 and whose center of curvature is located in the center of the aperture 2. The guide portion 8' of the retaining section 8 is located at the other side of the plane 5 and is spaced from the main section 1a. The center of curvature of the guide portion 8' is also located in the center of the aperture 2, and the two guide portions are preferably disposed in two parallel or nearly parallel planes. The retaining section 8 resembles a U-shaped body one leg of which is located in the plane 5 and the other leg of which is located in a plane that is parallel with the plane 5, this other leg having a free arcuate edge portion which constitutes the guide portion 8'. Thus, it can be said that the retaining section 8 is formed by bending it twice at right angles with reference to the plane 5, namely, first to provide the web 8a and the one leg, and second to provide the other leg with the guide portion 8'.

The retaining sections 7 and 8 are respectively provided with arcuate corrugations or beads 9 and 10 whose purpose will be described later.

The clamp 1 further comprises two projections or lugs 11, 12 which are angularly spaced from each other and extend to the same side of the plane 5, i.e., to the same side as the retaining section 7. FIG. 2 shows that the lugs 11, 12 are located substantially diametrically opposite each other and that their distance from the center of the aperture 2 is less than the distance of the corrugations 9 and 10. The lug 11 is of rectangular shape and has a bent-over nose or tip 13 which extends toward the aperture 2. The main portion of the lug 11 is substantially normal to the plane 5. The other lug 12 also resembles a rectangular plate but is offset only slightly from the plane 5. This other lug 12 may be obtained by forming the main section 1a with a U-shaped cut and by bending the material which is surrounded by the U-shaped cut from the plane 5. The lug 11 originally forms an extension 11' of the main section 1a, this extension being indicated in FIG. 2 by phantom lines. The extension 11' is bent twice to form the lug 11 and its nose 12.

FIG. 3 shows one of the funnel-shaped depressions 4a which surrounds the corresponding bore 4. It will be seen that the corrugation 3 need not extend very far beyond the plane 5 of the main section 1a.

FIGS. 4 and 5 illustrate a fully assembled coupling element 15 which is obtained by connecting the clamp 1 of FIGS. 1 and 2 with a hollow casting 16 which constitutes a carrier for the clamp. The carrier 16 comprises a substantially spherical hollow portion 17 and a nipple 18 which is provided with internal threads 36 so that it may be readily attached to one end of a supply line or service line, not shown. The numeral 19 denotes the axis of the nipple 18 and of a bore 35 provided in the spherical portion 17. The axis 19 preferably passes through the center of the spherical portion 17, and this spherical portion is provided with two recesses 20, 21 which respectively receive the nose 13 of the lug 11 and the lug 12. The recesses 20, 21 are located in separate planes which are parallel with the axis 19 and the recess 20 is located opposite the nipple 18. The recess 21 is formed by milling in an end face 16a of the carrier 16 and is just deep enough to accommodate the lug 12. It will be seen that the recesses 20, 21 and the lugs 11, 12 together constitute an arrangement which prevents rotation of the clamp 1 about the center of its aperture 2. This arrangement forms part of a connecting means which secures the clamp 1 to the carrier 16, and the connecting means further comprises two screws, bolts or similar threaded fasteners 33 which extend through the bores 4 and into tapped blind bores 34 in the carrier 16.

The spherical portion 17 of the carrier 16 is further provided with a relatively large bore 22 which includes portions of different diameter and whose axis is normal to and intersects the axis 19 of the bore 35. The bores 22, 35 form with the bore of the nipple 18 a fluid-conveying passage one end of which is located in the end face 16a of the carrier 16 and, when the clamp 1 is properly secured to the carrier, its aperture 2 is adjacent to and registers with the upper end of the bore 22. The carrier 16 is formed with two internal annular shoulders 23, 26 which separate the aforementioned portions of the bore 22 from each other. The shoulder 23 serves as an abutment or stop for an annular flange 24 forming part of an annular sealing member 25 of elastically deformable material, and the flange 24 is deformed and bears against the shoulder 23 when the clamp 1 is properly secured to the carrier 16. The annular corrugation 3 of the main section 1a then penetrates into the upper end face of the flange 24 to prevent any, even minimal, leakage of fluid along the shoulder 23. The other shoulder 26 of the carrier 16 constitutes a stop for the lower end face 28 of a disk-shaped valve member 27 which is received with clearance in the bore 22 and is biased upwardly, as viewed in FIG. 4, by a strong helical expansion spring 29. The spring 29 tends to maintain the upper end face of the valve member 27 in sealing engagement with the lower end face of the flange 24 so that the latter actually constitutes a seat for the valve member. The upper end face of the valve member 27 is provided with an annual corrugation or bead 30 which penetrates into the flange 24 to insure an absolutely leakproof sealing action. The valve member 27 includes a centrally located boss 31 which extends through and beyond the aperture 2 when the corrugation 30 bears against the flange 24. The sealing member 25 comprises a cylindrical portion 32 which surrounds the boss 31 with substantial clearance and also extends through and beyond the aperture 2.

The screws 33 are preferably of the flat-head type so that their heads may be fully received in the depressions 4a. These screws insure that the flange 24 is properly compressed by the main section 1a and that the corrugation 3 will penetrate into and deforms the flange.

When the coupling element 15 of FIGS. 4 and 5 is to be connected with a similar second coupling element (not shown), the cylindrical portions 32 of the two sealing members 25 are moved into axial alignment and are pressed against each other so that, on rotation of one coupling element 15 with reference to the other coupling element, the guide portion 7' of one clamp 1 will be slid under the guide portion 8' of the other clamp and vice versa. This connects the two elements 15 against axial movement with reference to each other and, at the same time, a motion transmitting member of the other (non-illustrated) coupling element depresses the boss 31 into the bore 22 so that the valve member 27 moves away from the flange 24 to open a path for the flow of fluid through the cylindrical portion 32, bore 22, bore 35 and nipple 18. The two coupling elements are further provided with cooperating locking means which prevent unintentional rotation of interconnected clamps with reference to each other. Such locking means are known in the art and form no part of the present invention. The manner in which the boss 31 may be depressed in response to connection of the coupling element 15 with a similar coupling element will be readily understood by referring to my U.S. Patent No. 3,155,434.

The corrugations 9 and 10 improve the elasticity of the retaining sections.

It is clear that the improved coupling is susceptible of many modifications without departing from the spirit of my invention. For example, the lugs 11, 12 and the recesses 20, 21 may be omitted if the fasteners 33 suffice to provide a satisfactory connection between the clamp 1 and the carrier 16. Also, the lugs 11, 12 may be replaced by a stud or rod which is fixed to one of the carriers 16 and passes through a suitable bore or cutout in the clamp of the other carrier when the two coupling elements are properly attached to each other. All such modifications are so obvious, particularly in view of the detailed description of FIGS. 1 to 5, that each thereof will be readily understood without necessitating additional illustrations.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a coupling, a coupling element comprising a hollow carrier having an end face and provided with a fluid-conveying passage one end of which is located in said end face; a replaceable clamp comprising a planar main section adjacent to said end face and having an aperture registering with the end of said passage, and a pair of angularly spaced retaining sections integral with said main section and having arcuate guide portions disposed at the opposite sides of and spaced from said main section; and means releasably securing said clamp to said carrier against movement relative to the latter.

2. In a coupling, particularly for conveying a compressed fluid in brake systems of automotive vehicles, a coupling element comprising a hollow carrier having an end face and provided with a fluid-conveying passage one end of which is located in said end face; a replaceable clamp consisting of a single sheet of metallic material and comprising a planar main section having a substantially circular aperture adjacent to said end face and registering with the end of said passage, said clamp further comprising two retaining sections angularly spaced from each other with reference to the center of said aperture and each having an arcuate guide portion whose center of curvature is located in the center of said aperture, said guide portions being spaced from and being located at the opposite sides of said main section; and connecting means releasably securing said clamp to said carrier against movement relative to the latter.

3. In a coupling, particularly for communicatively connecting two fluid-conveying lines in the brake system of an automotive vehicle, a pair of coupling elements each comprising a hollow carrier having an end face and provided with a fluid-conveying passage one end of which is located in the respective end face, a replaceable clamp consisting of a single sheet of metallic material and comprising a planar main section having an aperture adjacent to and registering with the end of the respective passage, each clamp further comprising two retaining sections angularly spaced from each other with reference to the center of the respective aperture and each having an arcuate guide portion whose center of curvature is located in the center of the respective aperture, said guide portions being spaced from and being located at the opposite sides of the respective main section, the guide portion located at one side of one of said main sections slidably engaging the guide portion located at the other side of the other main section so that such guide portions provide a connection between said clamps; and connecting means releasably securing said clamps to the respective carriers against movement relative to the latter.

4. In a coupling, particularly for communicatively connecting two fluid-conveying lines in the brake system of an automotive vehicle, a pair of coupling elements each comprising a hollow carrier having an end face and provided with a fluid-conveying passage one end of which is located in the respective end face, a replaceable clamp consisting of a single sheet of metallic material and comprising a planar main section having an aperture adjacent to and registering with the end of the respective passage, each clamp further comprising two retaining sections angularly spaced from each other with reference to the center of the respective aperture and each having an arcuate guide portion whose center of curvature is located in the center of the respective aperture, said guide portions being spaced from and being located at the opposite sides of the respective main section, the guide portion located at one side of one of said main sections slidably engaging the guide portion located at the other side of the other main section so that such guide portions provide a connection between said clamps; and connecting means releasably securing said clamps to the respective carriers, said connecting means comprising means for holding said clamps against angular and axial movement with reference to the respective carriers.

5. In a coupling, particularly for conveying a compressed fluid in brake systems of automotive vehicles, a coupling element comprising a hollow carrier having an end face and provided with a fluid-conveying passage one end of which is located in said end face; a replaceable clamp consisting of a single sheet of metallic material and comprising a planar main section having an aperture adjacent to said end face and registering with the end of said passage, said clamp further comprising two retaining sections angularly spaced from each other with reference to the center of said aperture and each having an arcuate guide portion whose center of curvature is located in the center of said aperture, said guide portions being spaced from and being located at the opposite sides of said main section and one of said retaining portions resembling a U-shaped body having a first leg substantially coplanar with said main section and a second leg parallel with and spaced from said first leg, the guide portion of said one retaining section constituting the free edge portion of said second leg; and connecting means releasably securing said clamp to said carrier against movement relative to the latter.

6. In a coupling, particularly for conveying a compressed fluid in brake systems of automotive vehicles, a coupling element comprising a hollow carrier having an end face and provided with a fluid conveying passage one end of which is located in said end face; a clamp consisting of a single sheet of metallic material and comprising a planar main section having an aperture adjacent to said end face and registering with the end of said passage, said clamp further comprising two retaining sections angularly spaced from each other with reference to the center of said aperture and each having an arcuate guide portion whose center of curvature is located in the center of said aperture, said guide portions being spaced from and being located at the opposite sides of said main section; and connecting means securing said clamp to said carrier, said connecting means comprising an arrangement including at least one projection extending from said main section and into a complementary recess provided in said carrier to thereby hold said clamp against rotation about the center of said aperture.

7. A coupling element as set forth in claim 6, wherein said arrangement includes additional projections extending from said main section, all of said projections being angularly spaced and each of said projections extending into a complementary recess provided in said carrier.

8. In a coupling, particularly for communicatively connecting two fluid-conveying lines in the brake system of an automotive vehicle, a coupling element comprising a hollow metallic carrier having an end face and provided with a fluid-conveying passage one end of which is located in said end face; a clamp consisting of a single sheet of metallic material and comprising a substantially planar main section having an aperture adjacent to said end face so that said aperture registers with the end of said passage, and a pair of retaining sections each having an arcuate guide portion whose center of curvature is located in the center of said aperture, said guide portions being located in planes which are parallel to but disposed at the opposite sides of said main section; interengageable connecting means respectively provided on and securing said clamp to said carrier; and an annular sealing member disposed between said clamp and said carrier and sealingly compressed between the same in response to interengagement of said connecting means to prevent leakage of fluid along said end face.

9. A coupling element as set forth in claim 8, further comprising a valve member provided in said carrier and sealingly engaging said sealing member to seal said passage from said aperture, said valve member being arranged to move away from said sealing member in response to connection of said coupling element to a complementary coupling element.

References Cited
UNITED STATES PATENTS

| | | | |
|---|---|---|---|
| 454,649 | 6/1891 | Hallas | 285—424 |
| 813,747 | 2/1906 | Skillings | 137—614.02 |

FOREIGN PATENTS

| | | |
|---|---|---|
| 144,297 | 11/1951 | Australia. |
| 858,511 | 12/1952 | Germany. |

M. CARY NELSON, *Primary Examiner.*

W. CLINE, *Assistant Examiner.*